Oct. 21, 1952    J. CARANDELL MARIMON    2,614,509
METHOD OF MANUFACTURING AND REPAIRING ROOFS
OF RAILWAY WAGONS AND SIMILAR VEHICLES
Filed Feb. 18, 1948    3 Sheets-Sheet 3

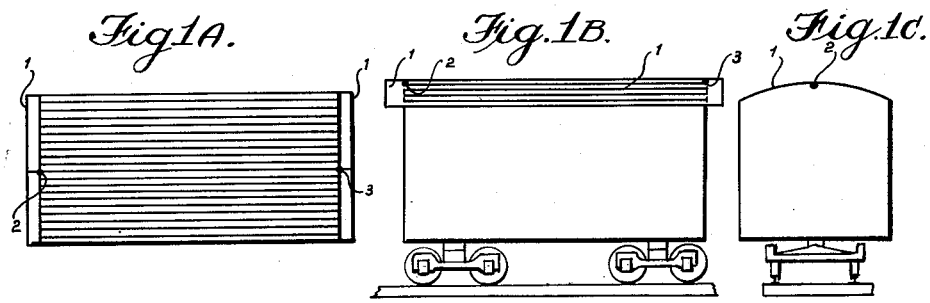
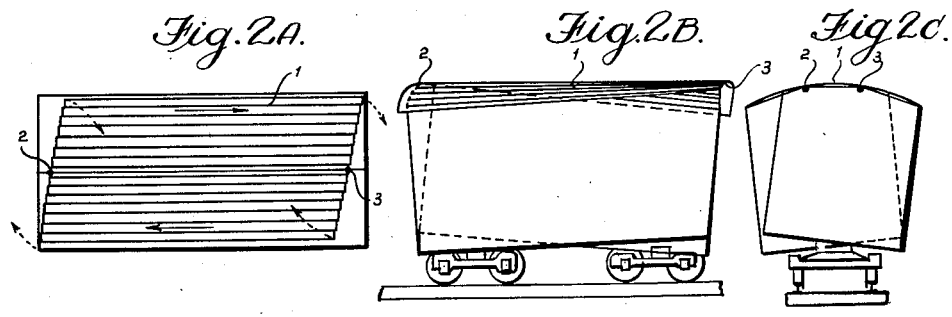
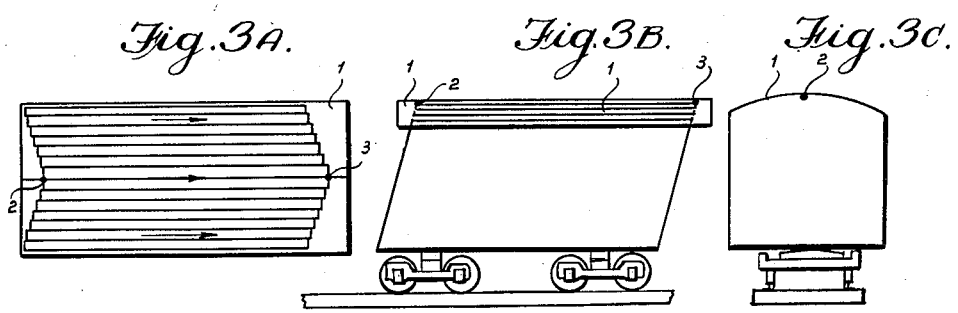

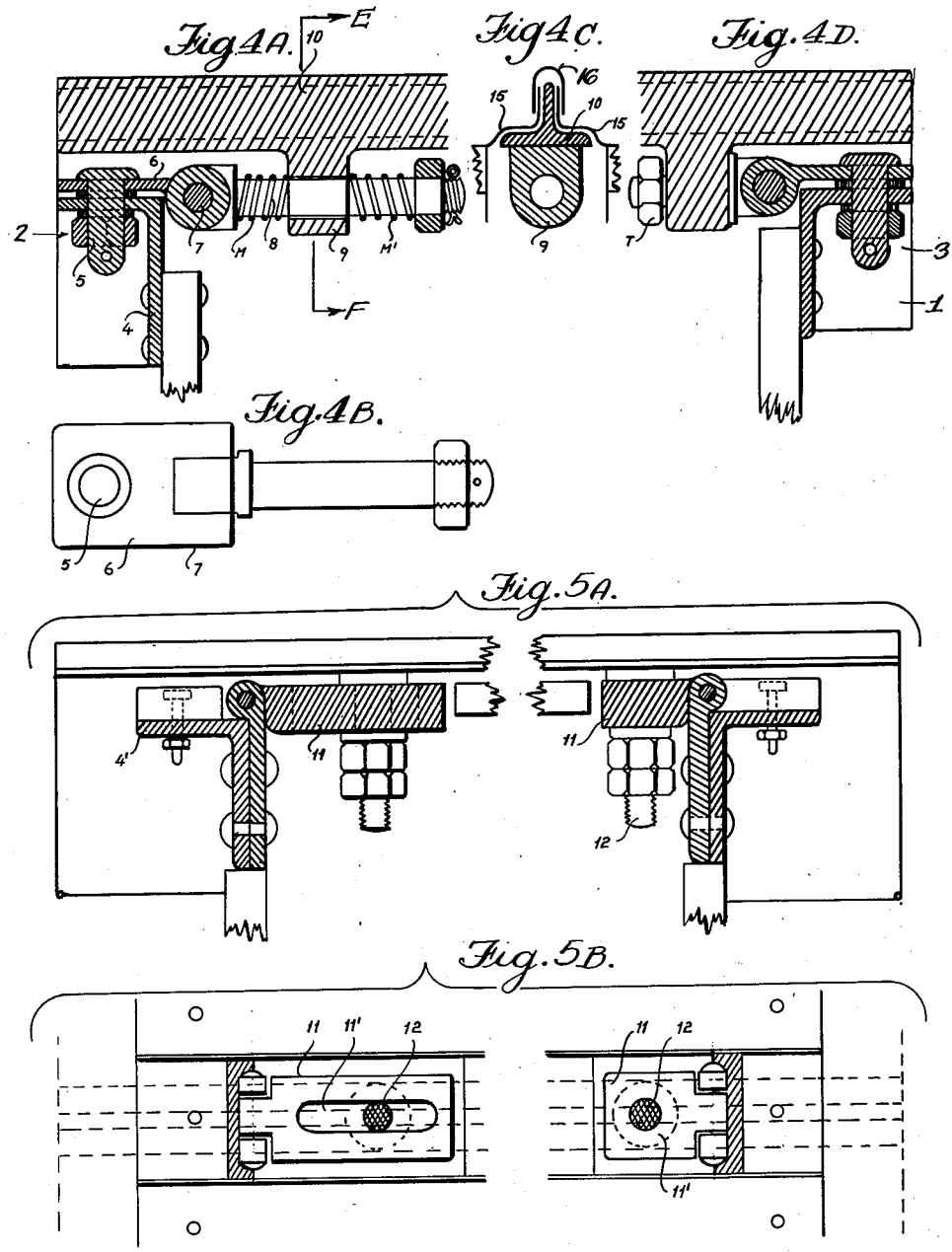

INVENTOR.
Juan Carandell Marimon
BY
C. F. Wenderoth
Attorney

Patented Oct. 21, 1952

2,614,509

UNITED STATES PATENT OFFICE 2,614,509

METHOD OF MANUFACTURING AND REPAIRING ROOFS OF RAILWAY WAGONS AND SIMILAR VEHICLES

Juan Carandell Marimón, Barcelona, Spain, assignor to Francisco Batalla Faidella, Barcelona, Spain Application February 18, 1948, Serial No. 9,218
In Great Britain October 26, 1945

Section 1, Public Law 690, August 8, 1946
Patent expires October 26, 1965

6 Claims. (Cl. 105—377)

This invention relates to railway wagons or similar vehicles.

The roof frame of a wagon constitutes a rectangle which during service undergoes constant deformation due to the inevitable movements set up in the chassis and the body.

This rectangle in practice must be regarded as articulated, and owing to said deformation the greater sides of the said rectangle are displaced, one with respect to the other, in parallel directions, while its shorter ends lose their straightness and follow the curvature of its arch in the curved roofs or the angle of its ridge piece in the case of sloping roofs.

The right angles at the four corners become alternately acute and obtuse. Whilst the frame of the roof is mobile, its surface is also mobile.

The long sections of which it is made become displaced relatively to each other, the movement being longer in the centre of the roof than at the longitudinal sides in cases where the end walls are inclined. The lateral walls of the wagon move in opposite directions in the case of the chassis warping, whilst the ridge piece remains stable and the end walls initiate a rotary movement about their axis of symmetry.

In order to render this somewhat unstable surface impervious to water, recourse has hitherto been had to impregnated canvas which in view of its relative elasticity is able for a certain time to resist the deformation and stresses to which it is likewise subjected owing to its being rigidly connected to the roof frame on its four sides.

The use of a more suitable and durable material, such as, for example, sheet metal, was not possible if it were rigidly secured to the roof, since its rigidity leads to the holding-down bolts being torn out or, if the latter are sufficiently strong, the sheet itself becomes cracked.

The present invention entirely eliminates the transmission of all the destructive movements in the roof and is based on the formerly set forth fact owing to which the longitudinal center-line of the roof, materialized by the ridge piece remains invariable in length and position when the cited deformations of the roof take place, said center-line being the one which connects the two centres of the shorter ends of an articulated rectangle when the latter undergoes deformation.

The said middle line constitutes the axis of the roof, whilst the constant deformation of the wagon during running has no effect thereon unless its unity is destroyed as a result of an accident.

The features of this middle line as set forth above serves as a basis for the fundamental theory of maintaining the roof of the wagon absolutely independent with respect to the body and vice versa, for that purpose the roof being assembled wholly and solely on points located therein, preferably two, one at each of the end walls of the wagon.

These mounting points are not rigid but are designed to absorb the movements of the roof, the body or frame and also the movements set up in the roof plates under the effects of temperature changes.

For the above purposes the mounting points in question are provided with vertical and horizontal spindles which maintain the roof rigidly in position relatively to the frame, thus enabling the end walls to initiate the movement of rotation about their vertical axis or to incline towards either side without any of the said movements being transmitted to the roof or setting up tension or stresses therein.

In order to prevent temperature changes damaging the roof sheets and at the same time facilitate their assembly, one of the said central supports is adapted to slide in the direction of the middle line of the roof. This sliding support must be mounted at the opposite end of the wagon away from the brakeman's cab in those wagons provided with the latter.

In these conditions, the characteristic feature of the sheet metal roof is that its length must be greater than the length of the wagon and extend sufficiently beyond the end walls to permit corresponding movements of the deformed rectangle without leaving the latter uncovered.

Throughout the remainder of its surface, the sheet metal roof is simply supported by the surface of the wagon but without being secured to the latter. To avoid the wind carrying away the roof or rainwater entering beneath the latter, the lateral strips of the sheet or sheets are appropriately flanged in such a manner that any lifting effect is counteracted by the engagement of a turned-back part against the back of the wagon. The same result can likewise be achieved by distributing, in the lateral edges, the lateral supports of a shape designed to facilitate displacement, by means of sheet metals provided with swivels, grooves or other analogous arrangements provided they facilitate the longitudinal displacement of the edge of the housing.

To enable the invention to be more readily understood the invention will now be described with reference to the accompanying drawings, which illustrate by way of example, a number of embodiments of the invention.

Fig. 1A is a plan view of a conventional vehicle with conventional attached roof in the position of repose;

Fig. 1B is an elevational view of the embodiment of Fig. 1A;

Fig. 1C is a front elevational view of the embodiment of Fig. 1A;

Fig. 2A is a plan view of a conventional vehicle with conventional attached roof in which the body is subjected to torsion;

Fig. 2B is an elevational view corresponding to Fig. 2A;

Fig. 2C is a front elevational view corresponding to Fig. 2A;

Fig. 3A is a plan view of a conventional vehicle with conventional attached roof in which the end walls have become inclined along the longitudinal axis of the wagon;

Fig. 3B is an elevational view corresponding to Fig. 3A;

Fig. 3C is a front elevational view corresponding to Fig. 3A;

Fig. 4A is a partial sectional elevational view of a roof suspension;

Fig. 4B is a partial plan view of a portion of Fig. 4A;

Fig. 4C is a sectional view taken on line E—F of Fig. 4A;

Fig. 4D is a view similar to Fig. 4A taken on the opposite end;

Fig. 5A is an elevational view partly in section of a modification of the roof suspension;

Fig. 5B is a plan view of Fig. 5A partly in section;

Figure 6A:
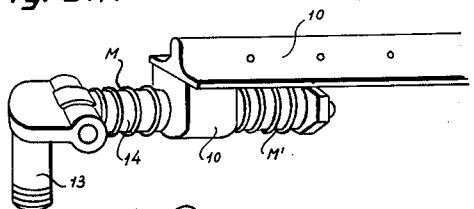
Fig. 6A is a perspective view of a modification of the support for the ridge piece of the roof.

The invention consists in mounting the roof 1 of the wagon V on supporting points 2, 3 (Figs. 1 to 6 A and B respectively), these points 2 and 3 being located on the longitudinal centre line of the wagon and at the end walls of the wagon.

By means of this assembly system the roof of the wagon is completely independent of the movements of the body although it is mechanically connected thereto in a hinged manner, at said points 2 and 3. In this way the roof of the wagon does not become deformed, since it is not affected by the deformations of the walls of the said wagon, caused by the movements performed by the frame thereof under the action of the shocks and thrusts which every railroad vehicle is submitted to during its running.

The practical method of carrying the invention into effect is shown in Figures 4A to 6B. In Figure 4A a support is shown consisting of an angle iron 4 secured to an end wall of the wagon in which a pivot 5 is mounted having a free rotary movement and under the head of which is loosely fitted a hinge plate 6 pivoted on a spindle 7 mounted on the head of a bolt 8 carried by a strap 9 welded to the lower part of the ridge piece 10.

At the other end of the ridge piece a somewhat similar method of mounting is shown at Fig. 4D, but the difference between the two supports resides in the fact that in one case the pivot is of sufficient length to enable it to slide axially in the strap and therefore permits the expansion of the sheet and facilitates assemblage without the need of any prior adjustment of the interconnected members, whilst in second case the pivot is short in order to secure the position of the ridge piece.

It will therefore be seen that with this method of securing the roof there are two fundamental axes: one vertical 5 and another horizontal 7, both parallel to the end walls of the wagon.

In Fig. 4C is represented a cross section taken on the plane E—F of Fig. 4A which shows the arrangement of the strap 9 below the ridge piece 10.

In the non-displaceable end the pivot is given the length necessary to enable it to be secured by the nut T against the face of the strap.

A modified embodiment of this assembly is shown in Fig. 5A, in which, against the side of the angle 4' there is located one of the plates of a hinge, the other plate 11 being provided with a circular aperture 11a or a slotted aperture 11', according to the end at which it acts, surrounding a pivot 12 located at each end of the ridge piece. This pivot thus constitutes the vertical axis of rotation, whilst the pin of the hinge constitutes the horizontal axis, both parallel to the corresponding end wall.

Figure 6B:
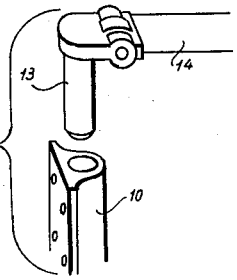
Fig. 6B is an exploded view of a further modification.

Another modified embodiment of the support for the roof ridge piece is shown in Fig. 6A, in which a pivot 13 is provided at each end and has a number of lugs for the horizontal axis of rotation of the head of a bolt 14 fitting into the strap 10' located below the ridge piece 10 or connected to the end wall as indicated in Fig. 6B at 10.

In the embodiments illustrated in Figures 4A to 6B, the sliding part of one of the said supports may be simply housed in the strap 9 and be guided by the latter during its displacement or may be provided with compensating springs M and M' which take up the stresses to which the bolt fixed at the other end is subjected.

Figure 9:
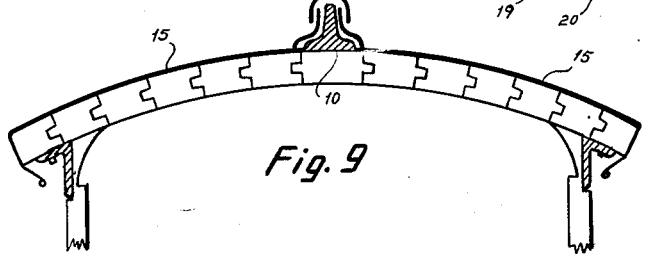
Fig. 9 is a cross sectional view of the upper frame of the wagon showing the roof sheeting.

The roof sheet is arranged as shown in cross section in Figure 9, in which it will be seen that the sheet 15 is supported on both sides of the inverted T of the ridge piece 10 and is superimposed by the longitudinal coping member 16.

Figure 7:
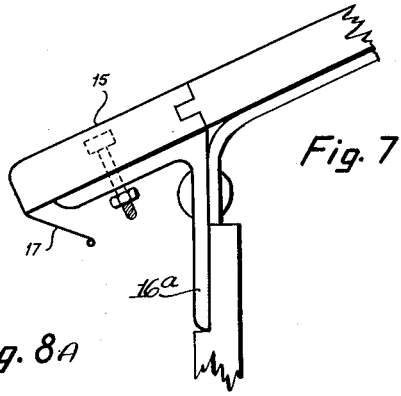
Fig. 7 is a partial elevational view of the lateral parts of the roof sheeting.

The sides of this sheet are bent over against the extreme sections which compose the longitudinal edges of the roof, the bent part being located below the latter, and angles 16a fixed to the upper edges of the lateral walls of the wagon, in order to prevent them being lifted by the wind. These bent over flanges 17 are shown in Figure 7.

Figure 8A:
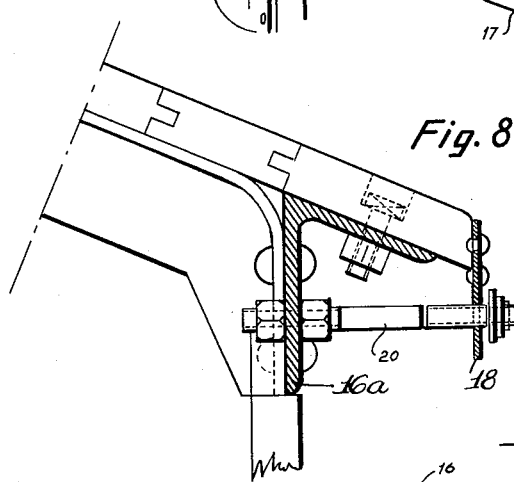
Fig. 8A is a partial view of an embodiment of an arrangement for the lateral parts of the roof sheeting partly in section.
Figure 8B:
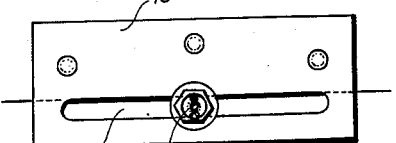
Fig. 8B is an elevational view of the sheet of view Fig. 8A with attaching means therefor.

In Figs. 8A and 8B the flanges have been replaced by sheets 18 placed at intervals and provided with a slotted slideway 19 to permit the longitudinal displacements of the body of the wagon on the bolts 20.

Having now particularly described and ascertained the nature of my said invention and in what manner the same is to be performed, I declare that what I claim is:

1. In a railway wagon and the like, a rigid roof for said wagon, securing means for said rigid roof, said securing means being attached to the end walls of said wagon along the longitudinal middle line of said wagon, said rigid roof being solely and exclusively secured to said wagon by said securing means.

2. In a railway wagon and the like as claimed in claim 1, said securing means for said rigid roof comprising a hinge joint at each end of said rigid roof, each hinge joint having one flap pivotally mounted on a vertical axis secured to the end wall of the frame of said wagon, a horizontal axis disposed laterally of the wagon at the free end of said flap, a second cylindrical flap in said hinge joint being articulated on said horizontal axis and disposed longitudinally to the wagon and having sufficient length to allow relative longitudinal movement of the wagon and rigid roof, a ridge piece along the longitudinal middle line of the frame of said wagon for supporting said rigid roof, a strap on said ridge piece extending downwardly into said wagon and having an opening therethrough slidably and rotatably engaging said cylindrical flap in said hinge joint.

3. In a railway wagon and the like as claimed in claim 2, and spring means interposed between said hinged securing means and said strap and between said strap and the end of said cylindrical flap for absorbing stress to which said flap is subjected.

4. In a railway wagon and the like, as claimed in claim 3, means secured to the lateral edges of said rigid roof for preventing lifting thereof but allowing free movement of the frame longitudinally of the wagon and having extreme portions bent downwardly, the said bent portions extending under the lateral edges of said rigid roof.

5. In a railway wagon and the like, as claimed in claim 4, and including sheets fixed to the edge of the roof at regular intervals, slotted slideways in said sheets having sufficient length to allow the relative movement of the lateral walls of the wagon, screws secured to the upper edges of said lateral walls in a position opposed to said sheets and ends of said screws co-operating with the said slotted slideways.

6. In a railway wagon or the like as claimed in claim 1, said securing means for said rigid roof comprising a hinge joint at each end of said rigid roof, one of those hinge joints having one flap pivotally monuted on a vertical axis secured to the opposite end wall of the frame of said wagon, a horizontal axis disposed laterally of the wagon at the free end of said flap, a second cylindrical flap in said hinge joint being articulated on said horizontal axis and disposed longitudinally to the wagon, a ridge piece along the horizontal middle line af the frame of the said wagon for supporting said rigid roof, a strap on said ridge piece extending downwardly into said wagon and having an opening therethrough rotatably engaging said cylindrical flap in said hinge joint.

JUAN CARANDELL MARIMÓN.

REFERENCES CITED

The following references are of record in the file of this patent:

UNITED STATES PATENTS

| Number | Name | Date |
|---|---|---|
| 1,160,835 | Brown | Nov. 16, 1915 |
| 1,243,979 | Roberts | Oct. 23, 1917 |
| 1,252,259 | Geiger | Jan. 1, 1918 |